United States Patent [19]

Bieri

[11] 3,915,241

[45] Oct. 28, 1975

[54] METHOD AND APPARATUS FOR TEMPORARILY SECURING A TOOL TO A SUPPORTING SURFACE

[76] Inventor: Hans Bieri, Toedistrasse 9, 8330 Pfaeffikon, Switzerland

[22] Filed: Feb. 7, 1975

[21] Appl. No.: 547,937

Related U.S. Application Data

[63] Continuation of Ser. No. 408,798, Oct. 23, 1973.

[30] Foreign Application Priority Data

Oct. 24, 1972 Switzerland...................... 15495/72

[52] U.S. Cl. ..................... 173/32; 173/152; 408/76
[51] Int. Cl.[2] ......................................... B23B 45/14
[58] Field of Search .................. 173/1, 32, 33, 213; 408/76; 248/2, 12, 13, 362

[56] References Cited
UNITED STATES PATENTS 3,456,738  7/1969  Harry................................ 173/32 X
3,550,701  12/1970  Holley............................. 173/33 X

*Primary Examiner*—Frank L. Abbott
*Assistant Examiner*—William F. Pate, III
*Attorney, Agent, or Firm*—W. G. Fasse

[57] ABSTRACT

A method and apparatus for temporarily attaching a power driven tool to a surface, such as a concrete wall, for drilling, milling, sawing or grinding of the surface, includes a rigid suction bell. A tool holding device is mounted on the outside of the bell in a position to enable a tool held thereby to engage the surface outside of the rim of the bell. The rim of the bell is provided with an elastic seal, and at least three preferably adjustable legs are provided on the bell to space the rim of the bell from the supporting surface, thereby limiting the deformation of the elastic sealing ring. The suction bell is adapted to be connected to a vacuum source, preferably for continuous evacuation during a machining operation on the surface.

13 Claims, 4 Drawing Figures

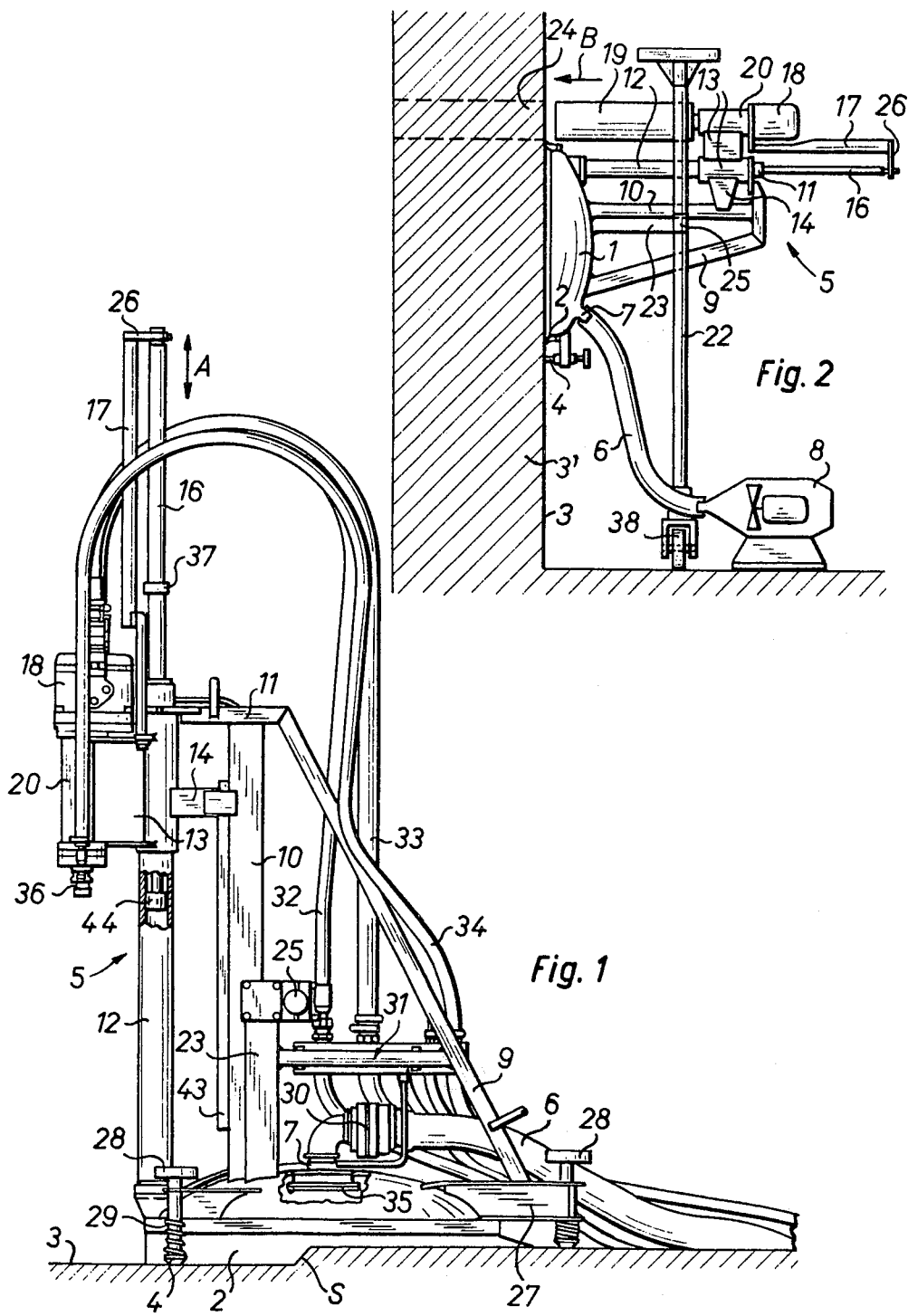

METHOD AND APPARATUS FOR TEMPORARILY SECURING A TOOL TO A SUPPORTING SURFACE

This is a continuation of application Ser. No. 408,798 filed Oct. 23, 1973.

BACKGROUND OF THE INVENTION

The present invention relates to an apparatus for temporarily securing a tool to a supporting surface. More specifically the invention relates to providing a support for a power driven tool for machining, for example, concrete, walls, or the like. The present support structure is suitable for holding a power drill, a milling apparatus, a saw, a grinding apparatus, or any other machining device. The invention further relates to a method for operating the present apparatus.

In connection with material removing machining oprations, for example, on concrete walls, especially where holes must be drilled into such walls or where milling operations must be performed, for example, on building walls, the problem exists to find a supporting point for the tool in order to apply the necessary feed advance pressure to the tool. Such operations are necessary, for example, where subsequent to the erection of the walls, holes must be drilled for pipes and conduits or the like, for example venting conduits or where it is necessary to provide an opening in the wall for the insertion of an expander, for example in connection with wrecking operations. The efficiency of such operations depends largely on the feed advance pressure which may be applied to the tool. However, for this purpose, it is necessary to have available a support point which should be rather rigid in order to avoid breakage of the tool proper.

Heretofore, suction devices have been used for various purposes, for example in the form of suction cups or suction bells. These prior art suction means have the disadvantage that they are constructed to elastically yield because the suction means are conventionally made of rubber or similar elastic material, whereby due to their elastical yielding these devices are not suitable for supporting a power operated tool for which the feed advance pressure may amount to several hundred pounds. Another drawback in this connection is seen in that an elastical support would tend to cause the frequent breaking of the tool proper, for example, of the drill bit.

OBJECTS OF THE INVENTION

In view of the foregoing, it is the aim of the invention to achieve the following objects singly or in combination:

to provide a tool support which overcomes the drawbacks of the prior art as outlined above;

to provide a tool support which may be conveniently secured in a temporary manner to any type of wall even a vertical wall and/or a rough surface wall;

to provide a tool support which will rigidly support a tool whereby damage to the tool proper will be minimized and whereby a substantial feed advance pressure may be applied to the tool so that the machining operation may be performed in a reasonably short time and thus with useful efficiency, for example where a hole of large diameter must be drilled into a concrete wall;

to provide a tool support which may be temporarily secured to any wall or the like by means of suction, whereby a gasket between the wall or the like and the housing to be evacuated shall be subtantially relieved from the pressure resulting from the fact that said housing is being evacuated; and to provide a tool support which may be rapidly moved from one location to another.

SUMMARY OF THE INVENTION

According to the invention there is provided an apparatus for temporarily securing a tool support to a supporting surface, whereby the tool means are rigidly secured to a rigid suction housing or so called suction bell which in turn is connectable to a vacuum source and which is provided with a sealing gasket of elastic material, such as rubber, surrounding its bearing surface. The suction bell is further provided with at least three supporting legs arranged adjacent to said bearing surfaces, whereby the height of the sealing gasket and the length of these supporting legs are selected relative to each other in such a manner that the deformation of the sealing ring as a result of the reduced pressure inside the suction bell, is limited.

The method of the invention teaches to operate the above defined supporting apparatus in such a manner that the suction source is continously connected to the suction bell during the entire working operation in order to compensate for leakage losses between the pressure relieved sealing rings of the suction bell and the supporting surface, especially a rough supporting surface.

The invention has the advantage that it has become possible to achieve even on relatively very rough and uneven supporting surfaces the necessary suction force which will permit the feed advance pressure required for example for material removing machining operations. Simultaneously a very stable supporting of the entire structure is achieved because the suction bell does not rest on the elastic sealing ring, but rather on the rigid supporting legs which take up the contact force resulting from the evacuation of the suction bell.

BRIEF FIGURE DESCRIPTION

In order that the invention may be clearly understood, it will be described, by way of example, with reference to the accompanying drawings, wherein:

FIG. 1 is an elevational side view of an apparatus according to the invention, whereby the suction bell is secured to a horizontal wall;

FIG. 2 is a somewhat schematic side view of the apparatus according to the invention, wherein the suction bell is secured to a vertical wall;

DETAILED DESCRIPTION OF EXAMPLE EMBODIMENTS

Figure 3:
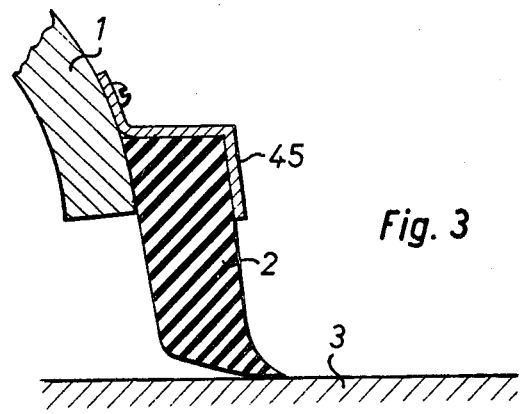
FIG. 3 is a sectional view through the securing means for the sealing ring on a somewhat enlarged scale as compared to the other figures.

The present apparatus comprises a suction bell 1 of rigid construction, for example, of sheet metal. The suction bell 1 has a lower rim 1' to which is secured a sealing ring or gasket 2 which rests against a supporting surface 3 such as a wall 3' as best seen in FIG. 3. The gasket 2 may be clamped or otherwise conveniently secured to the bell 1 as shown in FIG. 3. If desired the clamp 45 may be adjustable. The sealing ring 2 is made of elastic material such as rubber to provide a vacuum seal relative to the supporting surface 3 which, for example, may be a concrete wall, a brick wall or any similar rigid structure which may have a rather rough surface. As illustrated in FIG. 3, the clamp 45 may be provided in the form of a clamping molding which extends around the entire suction bell 1.

Figure 4:
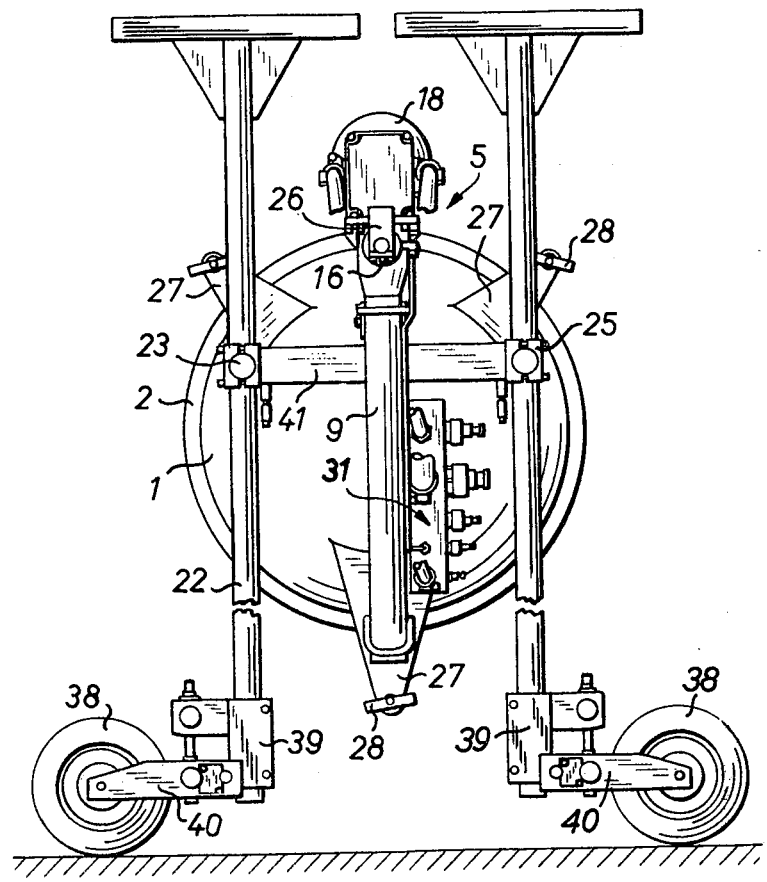
FIG. 4 is a plan view of the present apparatus as secured to a vertical wall and also illustrating the safety supporting means.

According to the invention there are provided three supporting arms 27 which are rigidly secured to the bell 1 for example by welding 27a. The supporting arms 27 extend preferably radially away from the suction bell 1 as seen in FIG. 4. Adjustment screws 4 extend through threaded holes at the outer ends of the arms 27. Preferably the screws are supported by a respective spring 29. One end of each screw is shaped to rest on the supporting surface 3. The opposite end of each screw is provided with a handle 28 for adjustment of the screw against the force of the respective spring 29 to vary the length of the screw relative to the height of the gasket or sealing ring 2. This feature permits for the compensation of the unevenness in the supporting surface 3 as illustrated in FIG. 1.

A hose or flexible conduit 6 is secured to the suction bell 1 by means of a pipe connection 7. The inner opening of the pipe connection 7 inside of the suction bell 1 may be covered by an air filter 35. The opposite end of the hose 6 is connected to a vacuum source 8, for example, an air suction pump for producing the necessary reduced pressure inside the suction bell 1. Preferably, a rapid release coupling 30 is provided between the hose 6 proper and the pipe connector or flange 7. The vacuum source 8 is power driven and preferably located remote from the suction bell 1. The suction capacity of the suction or vacuum source 8 is relatively large. For example, a drive motor of about 3 horsepower will be satisfactory for the compensation of leaking losses between the sealing ring 2 and the uneven or rough surface 3.

Rigid supporting rods 9 and 10 are secured to the outer surface of the suction bell 1 at one end of the rods 9, 10, for example by welding. The opposite end of the rods 9, 10 are interconnected by a flange 11 to form a frame structure which supports in a removable manner tool means 5. A cylindrical rod 12 is supported by the flange 11 at one end of the rod 12. The other end of the rod 12 is rigidly secured to the suction bell 1. The rod 12 constitutes a guide member for a carrier 13 of the tool 19. Thus, the carrier 13 is movable back and forth along the rod 12. The carrier 13 comprises a fork 14 which cooperates with the guide surfaces 43 of the rod 10 to secure the carrier 13 against rotation but to permit its longitudinal movement back and forth along the rod 12.

The means for moving the carrier 13 back and forth along the rod 12 will now be described. A piston 44 is movable inside the rod 12. The piston is connected to a piston rod 16 which extends out of the hollow rod 12. By supplying fluid under pressure to one or the other end of the hollow rod 12, the piston 44 is movable inside the rod 12 back and forth along with its piston rod 16 in the direction indicated by the double arrow A. This linear displacement of the piston 44 and rod 16 is transmitted to the carrier 13 through the further rod 17 extending in parallel to the rod 16 and connected to the rod 16 by a plate 26. For limiting the feed advance movement of the piston rod 16 a stop ring 37 is secured to the rod 16. The plate 26 provides a rigid interconnection between the rod or rail 17 and the rod 16. The rod 17 is rigidly secured to the hydraulic drive motor 18 which provides the rotational movement of the tool 19. The tool 19 is connected to the drive motor 18 through a spindle 36. Preferably the tool is a drill bit or a milling tool which is rotatably supported in a tool head 20. The spindle is also rotatably supported in the tool head and a reduction gear may be provided in the tool head between the drive motor 18 and the spindle 36 if desired. The supply and removal of fluid under pressure, which may be supplied from a remotely positioned hydraulic pump, is accomplished through flexible hose means 32, 33, 34 secured to a connecting plate 31 which is provided with connecting nipples for this purpose. These nipples assure an easy connection and disconnection between the flexible hose means and the hydraulic pump. Instead of using a hydraulic drive for the tool 19, the tool could also be driven by an electric motor. In any event, the carrier 13 and with it the head 20 is movable back and forth along the rod 12 by the piston 44 and its piston rod 16.

In order to facilitate the placing of the suction bell 1 and of the tool means 5 relative to a vertical wall 3, as illustrated in FIG. 2, there may be provided two safety supports 22. These supports 22 are adjustable relative to a rod 23 rigidly secured to the suction bell 1. A locking device 25 secures the safety supports 22 in the desired position. The position of the safety supports 22 is selected so that the supporting point thereof is located behind the center of gravity of the apparatus, whereby the suction bell 1 is secured against falling down in case the reduced pressure inside of the suction bell 1 should fail. Clamping bushings 39 are secured to the lower ends of the safety supports 22. The clamping bushing 39 in turn carry arms 40 to which there is secured a respective wheel 38 as illustrated in FIG. 4.

In order to drill a hole 24 in the wall 3' by means of a drill bit or a milling tool 19, the suction bell 1 is first placed into position at the desired location on the wall 3'. Then the vacuum source 8 is started. Thus, a reduced pressure or vacuum is produced inside the suction bell 1, such pressure should be at least 0.1 atm, preferably it should be in the range of about 0.15 to 0.3 atm. The diameter of the suction bell 1 should be at least 50 centimeters for this type of work. Preferably the diameter should be in the range of about 60 to 80 centimeters. As a result the available contact force amounts to several hundred kilograms. This force is sufficient for applying to the tool 19 a substantial feed advance force. By supplying a fluid under pressure, for example a pressure liquid, above the piston 44 inside the hollow rod 12 the tool 19 is moved in the direction of the arrow B as illustrated in FIG. 2. Simultaneously the drive motor 18 performs a rotational movement of the spindle. The vacuum source 8 is maintained in operation during the entire machining so that any leakage of air is compensated. This feature has the advantage that it is possible to attach the present apparatus even to a wall having a rough and uneven surface or even a step S in the surface as shown in FIG. 1, and to maintain a sufficient vacuum or reduced pressure within the suction bell 1. In this manner it is possible to attach the present apparatus not only to a floor or to a horizontal wall, but also to vertical walls or even to the ceiling in order to drill holes or to perform any other material removing machining or milling operation.

It will be appreciated that modifications may be made of the apparatus described above. For example, the supporting arms 27 could be arranged inside the suction bell 1 and the latter could have any desirable shape suitable for the particular purpose. For example, the suction bell 1 does not necessarily have to be round. Further, instead of the illustrated drill bit or milling tool 19, it is possible to secure in the manner disclosed a back and forth movable saw or a grinding tool attached to the tool head 20.

In the unloaded condition of the apparatus, so to speak, the protruding ends of the screws 4 are slightly shorter than the height of the protruding sealing ring 2. Thus, the sealing ring 2 is slightly compressed when the vacuum is applied, that is when the apparatus is "loaded" but simultaneously the contact forces are taken up by the screws 4 and the sealing ring 2 is relieved from such contact forces. Thus, according to the invention there are provided separate but cooperating means which on the one hand provide a sealing between the suction bell 1 and the supporting surface 3 and which on the other hand take up the contact force between the suction bell 1 and the supporting surface.

Although the invention has been described with reference to specific example embodiments, it will be appreciated, that it is intended to cover all modifications and equivalents within the scope of the appended claims.

What is claimed is:

1. An apparatus for the temporary attachment of a power driven tool means to a supporting surface of any inclination, comprising a rigid suction bell having a rim, a bearing surface on said rim adapted to face said supporting surface, a vacuum connection opening in said bell for evacuation of said bell, tool holding means for holding said tool means, means for affixing said tool holding means in a rigid manner to said bell, said tool holding means comprising means for holding said tool means laterally adjacent only one side of said bell, elastic sealing means on said bearing surface for sealingly engaging said supporting surface, and at least three supporting legs rigidly affixed to said bell and extending beyond said bearing surface in a direction to space said bearing surface from said supporting surface whereby the deformation of said sealing means is precisely limited during the entire duration of said evacuation.

2. The apparatus according to claim 1, for use with a rotary tool means having an axis of movement, wherein said means for affixing said tool holding means comprises securing means affixed to the outside surface of said bell for holding said tool holding means in a position with said axis of movement outwardly of said rim, whereby said tool holding means is positioned to hold said tool means to engage said supporting surface outwardly of said rim.

3. The apparatus according to claim 1, wherein said supporting legs are mounted on the outside of said bell, and further comprising means for adjusting said legs for varying said spacing.

4. The apparatus according to claim 1, wherein said means for affixing said tool holding means to said bell comprises guide rod means rigidly affixed to the outside of said bell at a position displaced from the center thereof, said tool holding means being mounted on said guide rod means for movement in a direction normal to said supporting surface.

5. The apparatus according to claim 4, wherein said guide rod means comprises a hydraulic cylinder, said apparatus further comprising a longitudinally movable hydraulically adjustable piston within said cylinder, and means connecting said piston to said tool holding means for moving said tool holding means.

6. The apparatus according to claim 4, further comprising drive motor means mounted on said tool holding means.

7. An apparatus for the temporary attachment of a powerr driven tool means to a supporting surface, comprising a rigid suction bell having a rim, a bearing surface on said rim adapted to face said supporting surface, a vacuum connection opening in said bell, tool holding means for holding said tool means substantially in a first direction extending perpendicularly to said supporting surface, means for affixing said tool holding means to said bell, elastic sealing means on said bearing surface for sealingly engaging said supporting surface, and at least three supporting legs mounted on said bell and extending beyond said bearing surface in a direction to space said bearing surface from said supporting surface to limit deformation of said sealing means, and further comprising safety support means releasably secured to said apparatus for holding the apparatus in a second direction extending perpendicularly to said first direction, said holding being effective independently of the vacuum in the suction bell to hold the apparatus even if the vacuum fails.

8. The apparatus according to claim 1, wherein said suction bell has a diameter of at least 50 centimeters.

9. The apparatus according to claim 1, wherein said suction bell has a diameter between 60 and 80 centimeters.

10. The apparatus according to claim 1, further comprising a vacuum source remote from said suction bell, flexible hose means connecting said vacuum source with said vacuum connection, hydraulic motor means mounted on said tool holding means for driving said tool means, and wherein said means for affixing said tool holding means to said bell comprises hydraulic cylinder piston means connected to control feed advance of said tool means.

11. A method for temporarily attaching a power driven tool means having an axis of movement to a vertical supporting surface, comprising mounting said tool means on a suction bell having an elastic sealing ring on its rim, positioning said suction bell against said supporting surface displaced from said axis and with said elastic ring contacting said surface, rigidly spacing said bell from said surface to limit deformation of said sealing ring, evacuating said bell to effect said attaching, carrying out a machining operation with said power driven tool means, maintaining said evacuating during said machining operation to compensate for leakage losses between said sealing ring and said supporting surface to thereby support said bell on said surface by vacuum within said bell also during said machining operation, and supporting said bell against substantial movement in the event of loss of said vacuum.

12. The method according to claim 11, wherein said step of evacuating comprises evacuating said bell to a pressure of at least 0.1 atmosphere.

13. An apparatus for the temporary attachment of a power driven tool means to a first supporting surface, comprising a rigid suction bell having a rim, a bearing surface on said rim adapted to face said first supporting surface, a vacuum connection opening in said bell, tool holding means for holding said tool means, means for affixing said tool holding means to said bell, comprising securing means affixed to the ouside surface of said bell for holding said tool holding means in a position outwardly of said rim, whereby said tool holding means is positioned to hold said tool means to engage said supporting surface outwardly of said rim, said tool holding means comprising guide rod means rigidly affixed to the outside of said bell at a position displaced from the center thereof, said guide rod means comprising a hydraulic cylinder, and further comprising a longitudinally movable hydraulically adjustable piston within said cylinder and means connecting said piston to said tool holding means for moving said tool holding means, said tool holding means being mounted on said guide rod means for movement in a direction normal to said first supporting surface, elastic sealing means on said bearing surface for sealingly engaging said supporting surface, at least three supporting legs mounted on the outside of said bell, and extending beyond said bearing surface in a direction to space said bearing surface from said supporting surface to limit deformation of said sealing means, means for adjusting said legs for varying said spacing, a vacuum source remote from said suction bell, flexible hose means connecting said vacuum source with said vacuum connection, hydraulic motor means mounted on said tool holding means for driving said tool means, and safety support means releasably secured to said bell and adapted to rest on a second supporting surface, said safety support means being effective to hold the apparatus substantially in a direction extending in parallel to said first supporting surface and perpendicularly to said second supporting surface independently of said vacuum.

* * * * *